(12) United States Patent
Yatagai et al.

(10) Patent No.: US 7,109,022 B1
(45) Date of Patent: Sep. 19, 2006

(54) COMPOSITION CONTAINING CALCIUM CARBONATE PARTICLES DISPERSED IN SULFUR FOR REMOVING NITRATE NITROGEN

(75) Inventors: Atsushi Yatagai, Saitama-ken (JP); Tomomichi Gunji, Saitama-ken (JP); Hiroshi Masujima, Urawa (JP); Takuma Yabe, Ageo (JP); Toru Oishi, Kisarazu (JP)

(73) Assignees: Nitchitsu Co., Ltd, Tokyo (JP); Nippon Steel Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/787,793

(22) PCT Filed: Sep. 24, 1999

(86) PCT No.: PCT/JP99/05226

§ 371 (c)(1),
(2), (4) Date: Jun. 12, 2001

(87) PCT Pub. No.: WO00/18694

PCT Pub. Date: Apr. 6, 2000

(30) Foreign Application Priority Data

Sep. 25, 1998 (JP) ............................................ 10/271920
Aug. 10, 1999 (JP) ........................................... 11/226206

(51) Int. Cl.
*C02F 3/00* (2006.01)
*C12S 13/00* (2006.01)
*C12N 11/14* (2006.01)
*C12N 11/02* (2006.01)
*C12N 1/00* (2006.01)

(52) U.S. Cl. ..................... 435/262.5; 210/601; 210/615; 210/616; 435/176; 435/177; 435/243

(58) Field of Classification Search ................. 435/177, 435/262, 262.5, 243, 176; 210/601, 615, 210/616
See application file for complete search history.

(56) References Cited

U.S. PATENT DOCUMENTS 4,428,700 A    1/1984   Lennemann

FOREIGN PATENT DOCUMENTS

| DE | 341 4556 A1 | 10/1985 |
|---|---|---|
| DE | 198 07 406 A1 | 8/1998 |
| JP | 53090192 | 8/1978 |
| JP | 56144797 | 11/1981 |
| JP | 58174293 | 10/1983 |
| JP | 59029092 | 2/1984 |
| JP | 59036600 | 2/1984 |
| JP | 60206494 | 10/1985 |
| JP | 131958 | 6/1989 |
| JP | 49119 | 2/1992 |
| JP | 04074598 | 3/1992 |
| JP | 04151000 | 5/1992 |
| JP | 04197498 | 7/1992 |
| JP | 06182393 | 7/1994 |

OTHER PUBLICATIONS

J.C. Kruithof et al., "Nitrate Removal From Ground Water by Sulphur/Limestone Filtration", Water Supply, 1988, vol. 6, Brussels, pp. 207–217.
J.P. van der Hoek et al., "Biological Nitrate Removal From Ground Water By Sulphur/Limestone Dentirification", Environmental Biotechnology Group Meeting, pp. 197–199.
P. LeCloirec et al., "Total dissolved inorganic nitrogen removal with two coupled autotrophic biological nitrification and denitrification processes–laboratory studies", Aqua, 1990, vol. 39 No. 1, pp. 16–23.
Abdel–Jawad et al., Cement and Concrete Research, vol. 24, pp. 165–175 (1994), XP–002271063.

*Primary Examiner*—David M. Naff
(74) *Attorney, Agent, or Firm*—Birch, Stewart, Kolasch & Birch, LLP

(57) ABSTRACT

This invention relates to a denitrifying composition which is a material to be used for decomposing nitrates nitrogen in effluent by sulfur-oxidizing bacteria that consume sulfur and carbonate as nutrients and is characterized by containing particles of calcium carbonate dispersed in sulfur. Preferably, the composition contains 10 parts by weight of sulfur coexisting with 10–15 parts by weight of calcium carbonate and 1–3 parts by weight of a microporous substance. This denitrifying composition can be prepared by heating powder of calcium carbonate and sulfur thereby melting the sulfur, dispersing the powder of calcium carbonate in liquid sulfur and solidifying the dispersion by rapid cooling. The composition simultaneously contains nutrients and alkali source and hence enables denitrification to proceed stably without addition of other components.

13 Claims, 1 Drawing Sheet

COMPOSITION CONTAINING CALCIUM CARBONATE PARTICLES DISPERSED IN SULFUR FOR REMOVING NITRATE NITROGEN

This application is the national phase under 35 U.S.C § 371 of PCT International Application No. PCT/JP99/05226 which has an International filing date of Sep. 24, 1999, which designated the United States of America and was published in English.

FIELD OF TECHNOLOGY

This invention relates to a denitrifying composition for microbially removing nitrates nitrogen and also to a process for producing the same. The denitrifying composition is used for purifying water or as a substrate for culture medium in cultivation of microorganisms.

BACKGROUND TECHNOLOGY

Among technologies for removing nitrates nitrogen intended for the purification of water, heterotrophic denitrification with the use of methanol or an organic carbon source in sludge as a hydrogen donor has been known. This a process is influenced by decomposing systems other than the target microorganisms and its denitrifying efficiency per substrate is low; however, it is capable of removing nitrates nitrogen relatively simply and is put to practical use in those treating facilities which are strictly controlled not to discharge methanol or sludge to outside after its use in denitrification. That is, the denitrifying operation according to this process cannot be completed by merely passing water to be treated through a single denitrifying tank and requires many treating steps and tanks and facilities.

In consequence, it has been difficult to apply this process to effluent of underdrains in farms; the effluent in question contains nitrogenous components mostly consisting of inorganic nitrates nitrogen and the concentration of nitrates nitrogen has become an issue in recent years. Moreover, there is the possibility of newly generating water pollution unless a denitrifying substrate is injected precisely in an amount conforming to the flow rate of the effluent under treatment and to the amount of nitrates nitrogen therein contained and the operation of heterotrophic denitrification requires equipment and full-time careful control such as installed and practiced in a sewage treating plant.

In contrast, autotrophic denitrification with the use of sulfur or a sulfur compound is limited to denitrification by sulfur-oxidizing bacteria; hence, it is effected at a high denitrifying efficiency per substrate and produces sulfate ions which are not limiting factors of water quality. Thus, the process offers an advantage that, where the content of sulfate ions is 1% or less, the treated water can be discharged as it is after control of its pH by a calcium compound. An example of sulfur-oxidizing bacteria is Thiobacillus denitrificans and a reaction represented by the following equation is known.

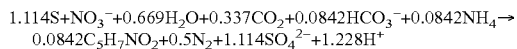

$$1.114S + NO_3^- + 0.669H_2O + 0.337CO_2 + 0.0842HCO_3^- + 0.0842NH_4^+ \rightarrow 0.0842C_5H_7NO_2 + 0.5N_2 + 1.114SO_4^{2-} + 1.228H^+$$

A number of processes for autotrophic denitrification with the use of sulfur or a sulfur compound have been proposed, for example, in the following patent literature; JP (Japan Patent) 62-56798 B (1987), JP 63-45274 B (1988), JP 60-3876 B (1985), JP 01-31958 B (1989), JP 04-9119 B (1992), JP 04-74598 A(1992), JP 04-151000 A (1992), JP 04-197498 A(1992), and JP 06-182393 A (1992).

Of the aforementioned processes, those described in JP 62-56798 B (1987) and JP 63-45274 B (1988) have been developed for treating effluent containing a variety of nitrogen compounds and sulfur compounds and respectively require a pretreatment at pH 3 or less or a step for cultivating activated sludge seeded with a group of sulfur-oxidizing baceria as dominant. In consequence, they cannot be said to be efficient in case the principal target of denitrification is nitrates nitrogen.

The processes described in JP 60-3876 B (1985) and JP 01-31958 B (1989), although not limited to denitrification aimed at nitrates nitrogen, respectively carry out denitrification by sulfur-oxidizing bacteria in the denitrification step following the nitrification step. However, they cannot carry out autotrophic denitrification efficiently because a sulfur component needs to be added in an amount conforming to that of nitrates nitrogen in the object to be treated or minute bubbles of nitrogen gas produced by denitrification cannot discharge by themselves and their discharge separately requires an aeration tank.

The process described in JP 04-9119 B (1992) relates to simultaneous removal of nitrogen and phosphoric acid from effluent with the use of marble composed of calcium carbonate and sulfur particles. However, the particles of marble and sulfur are not used in the same step and the process is fundamentally an aerobic-anaerobic activated sludge treatment. Therefore, unlike autotrophic denitrification with sulfur alone as denitrifying substrate, the process requires control of sludge and is not efficient for direct denitrification of nitrates nitrogen.

The process described in JP 04-74698 A (1992) is fundamentally an anaerobic-aerobic activated sludge treatment, but it performs more stably in removal of nitrates nitrogen than the aforementioned processes because of the introduction of sodium hydrogen carbonate or calcium carbonate as carbon source. The process, however, is not efficient for direct denitrification of nitrates nitrogen since it is low in denitrifying efficiency on account of pyrites being used as sulfur source and, besides, it remains in the category of activated sludge processes requiring a number of treating tanks.

The process described in JP 04-151000 A (1992) relates to autotrophic denitrification by sulfur-oxidizing bacteria with sodium hydrogen carbonate or calcium carbonate supplied as carbon source and a thiosulfate salt used as sulfur source and electron donor. The thiosulfate salt must be injected in an amount conforming to that of nitrates nitrogen in the object to be treated and, like the aforementioned, the process is not efficient for direct denitrification of nitrates nitrogen.

The process disclosed in JP 04-197498 A (1992) relates to autotrophic denitrification by sulfur-oxidizing bacteria as a pretreatment in purification of water. In this case as well, the efficiency drops markedly unless sodium sulfite is added in an amount conforming to that of the object of denitrification contained in raw water and the process cannot be adapted easily to direct denitrification of nitrates nitrogen.

Any one of the processes described thus far does not aim at direct denitrification of nitrates nitrogen as its object and most of them are no better than activated sludge processes and inefficient from the standpoint of denitrification. On the contrary, the process described in JP 06-182393 A(1994) can remove nitrate nitrogen efficiently by sulfur-oxidizing bacteria.

This process, however, uses sulfur powder that is highly reactive toward sulfur-oxidizing bacteria and effects denitrification by passing raw water containing nitrates nitrogen and the like through a fluidized bed reactor vessel in which a layer filled with sulfur powder is formed. Motive power is necessary to release nitrogen gas adhering to and between the sulfur particles in the course of denitrification and, unless the gas is released, the sulfur particles exhibiting good denitrifying efficiency become wrapped in bubbles and cannot participate in denitrification any longer. The same is true for the bubbles between particles. Other difficulties are a necessity for separate correction of the acidity of sulfuric acid being formed and a necessity for forced passage of raw water at all times to prevent the occurrence of high acidity which would stop the denitrification. Thus, general application of this process, for example, to the treatment of effluent of underdrains would be difficult to realize because it would incur considerable capital and running costs.

In addition, the aforementioned processes do not provide any concrete measures for supply of carbon source which is just as important as sulfur source and for control of the pH, namely, keeping the pH in the vicinity of 7, in order to maintain the activity of sulfur-oxidizing bacteria and effect denitrification with certainty.

Recent knowledge obtained in a learned society for water treatment suggests the importance of taking the following actions in order to effect denitrification smoothly by sulfur-oxidizing bacteria.

That is, it is essential to accelerate the multiplication of sulfur-oxidizing bacteria in order to sustain the denitrification reaction by the bacteria in question and, to accomplish this, it is necessary to supply with certainty carbon source that is required for the synthesis of bacteria in addition to sulfur that is a source of nutrient and to control the pH generally at 7 or higher to maintain the microbial activity. Reference should be made to (4–28) Removal of Nitrate Nitrogen from Actual Sewage by Denitrification with Sulfur, the 49th National Meeting for Presentation of Researches on Water Supply, May, 1998, Abstracts of Papers, pp. 238–239 (4. Section of Water Purification); Japan Water Supply Society. However, it is not always necessary to keep the pH at 7 or more as will be described below.

As illustrated above, the most efficient way for safe removal of nitrates nitrogen is autotrophic denitrification by sulfur-oxidizing bacteria, but it has been difficult to produce surely and easily the effect of this process.

Accordingly, an object of this invention is to provide a denitrifying composition for microbially removing nitrates nitrogen which does not require supply of carbon source that is essential to microorganisms, exhibits a good balance in the system before and after the reaction, reduces the influences of pH and chemical substances to the water area, and performs stably.

Another object of this invention is to provide a denitrifying material which can be brought into contact with effluent even during a dearth of water and can maintain a high denitrifying efficiency at all times.

A further object of this invention is to provide a process for producing the aforementioned denitrifying composition in a short time at low cost.

DISCLOSURE OF THE INVENTION

Thus, this invention relates to a denitrifying composition for microbially removing nitrates nitrogen comprising particles of calcium carbonate dispersed in sulfur. This invention also relates to a denitrifying composition comprising particles of calcium carbonate and particles of a substance possessing a cation exchange capacity or a microporous substance dispersed in sulfur. This invention further relates to a denitrifying material comprising a mixture of the aforementioned denitrifying composition and mineral fibers.

This invention still further relates to a process for producing a denitrifying composition which comprises heating powder of calcium carbonate and sulfur thereby melting the sulfur and dispersing the powder of calcium carbonate in the liquid sulfur and solidifying the dispersion by rapid cooling.

A denitrifying composition of this invention comprises a substance mainly consisting of calcium carbonate and sulfur as main components. Moreover, a denitrifying composition of this invention is a granular or massive substance comprising a substance mainly consisting of calcium carbonate and sulfur as main components and a microporous substance as a coexisting component; more particularly, a denitrifying composition of this invention is a granular or massive substance comprising 10–15 parts by weight of a substance mainly consisting of calcium carbonate and 10 parts by weight of sulfur as main components and 1–3 parts by weight of a microporous substance as a coexisting component. Still more, a denitrifying composition of this invention is a granular or massive substance comprising a substance mainly consisting of calcium carbonate and sulfur as main components and a microporous mineral product and/or a processed product thereof as a coexisting component; more particularly, a denitrifying composition of this invention is a granular or massive substance comprising 10–15 parts by weight of a substance mainly consisting of calcium carbonate and 10 parts by weight of sulfur as main components and 1–3 parts by weight of a microporous mineral product and/or a processed product thereof as a coexisting component. Furthermore, a denitrifying composition of this invention is a granular or massive substance comprising a substance mainly consisting of calcium carbonate and sulfur as main components and a microporous carbide as a coexisting component; more particularly, a denitrifying composition of this invention is a granular or massive substance comprising 10–15 parts by weight of a substance mainly consisting of calcium carbonate and 10 parts by weight of sulfur as main components and 1–3 parts by weight of a microporous carbide as a coexisting component. Still further, a denitrifying composition of this invention is a granular or massive substance comprising a substance mainly consisting of calcium carbonate and sulfur as main components and a microporous mineral product and/or a processed product thereof and a microporous carbide as coexisting components; more particularly, a denitrifying composition of this invention is a granular or massive substance comprising 10–15 parts by weight of a substance mainly consisting of calcium carbonate and 10 parts by weight of sulfur as main components and 1–3 parts by weight of a microporous mineral product and/or a processed product thereof and a microporous carbide as coexisting components. Finally, a denitrifying composition of this invention is a granular or massive substance comprising 10–15 parts by weight of calcium carbonate and 10 parts by weight of sulfur as main components and 1–3 parts by weight of kieselguhr and/or carbon derived from rice hull as coexisting components.

Since a denitrifying composition of this invention contains nutrients for sulfur-oxidizing bacteria which act to remove nitrates nitrogen and is consumed as denitrification progresses, it may be called either a composition for giving microbial activity or a substrate for removing nitrates nitrogen. Here, the nitrates nitrogen includes nitrates ions and nitrite ions.

A denitrifying composition of this invention contains calcium carbonate and sulfur as essential components; concretely, there exist a composition comprising calcium carbonate (including a substance mainly comprising of calcium carbonate) and sulfur (including a substance mainly comprising of sulfur) and a composition comprising calcium carbonate and sulfur as main components and a microporous substance as a coexisting component.

Calcium carbonate or a substance mainly consisting of calcium carbonate contained in a denitrifying composition of this invention is exemplified by calcium carbonate, powdered or crushed limestone, powdered or crushed seashell, powdered or crushed fossil of seashell, powdered or crushed dolomite, and powdered or crushed coral and they may be used either singly or as a mixture of two kinds or more.

Calcium carbonate or a substance mainly consisting of calcium carbonate to be used for producing a denitrifying composition of this invention is prepared as powder with a specific surface area of 2,000–5,000 $cm^2/g$, preferably 2,500–4,000 $cm^2/g$, by air permeability determination. The dispersibility to sulfur decreases if the specific surface area is too large or too small. An average particle size of less than 1 mm is beneficial to good dispersibility.

Sulfur contained in a denitrifying composition of this invention is preferably amorphous sulfur that is obtained by rapidly cooling molten sulfur. Sulfur to be used for producing a denitrifying composition of this invention is under no restriction as long as it can be melted and solidified by rapid cooling; for example, sulfur recovered in a plant for desulfurizing petroleum or coal and natural sulfur are useful, either as solid such as powder and granule or molten, and such sulfur may contain contaminants.

A microporous substance contained in a denitrifying composition of this invention is any substance with pores suitable for sulfur-oxidizing bacteria to settle in, preferably a mineral product or a processed product thereof and a carbide. Mineral products or processed products thereof include kieselguhr, calcined kieselguhr, tuff, kokaseki, perlite, pearlite, porous ceramic, brick, ALC, pumice stone, pozzolan, shirasu, shirasu balloon, calcined expanded shale, attapulgite, sepiolite, cristobalite, sericite, acid clay, and illite. Carbides are carbonaceous materials such as charcoal and include charcoal, carbon derived from coconut shell, carbon derived from rice hull, coke, carbon derived from bamboo, and activated carbon. Other microporous substances include volcanic ashes, soil, fly ash, cement, and concrete.

The water content in a microporous substance to be used in the production of a denitrifying composition of this invention is preferably 30% or less while the particle size is preferably 5 mm or less, more preferably 1 mm or less, in length. However, carbon derived from rice hull, uncaked shirasu, uncaked volcanic ashes, and uncaked soil may be used with no particular adjustment of the particle size.

A microporous sustance contained in a denitrifying composition of this invention may advantageously be a cation exchanger. Such cation exchangers include natural zeolites, synthetic zeolites, and bentonite. A cation exchanger, when substituted for a microporous substance, can remove ammoniacal nitrogen from effluent by adsorption and, besides, can hold the negatively charged microorganisms in the denitrifying composition by adsorbing calcium ions produced by the denitrification reaction. If necessary, it is possible to add sand, slag, and others to a denitrifying composition of this invention to the extent that the function of the composition is not adversely affected.

The ratio of sulfur to calcium carbonate in a denitrifying composition of this invention is not restricted as long as the sulfur works as a binder or matrix and gives a solid with a certain degree of strength, but the ratio by weight of sulfur to calcium carbonate is preferably 3:1 to 1:3, more preferably 2:1 to 1:2. Both sulfur and calcium carbonate serve as nutritents and gradually dininish and it is not advantageous to set the ratio in such a manner as to markedly destroy the balance of the two. The amount of sulfur is kept in the range 25–75%, preferably 33–67%, of the whole even in the cases where a microporous substance and others are added. A more preferable proportion is 10 parts by weight of sulfur, 10–15 parts by weight of calcium carbonate or a substance mainly comprising thereof and 1–3 parts by weight of a microporous substance. Where a cation exchanger is used as a microporous substance, zeolite is substituted to an amount corresponding to 5–20%, preferably 10% or so, of calcium carbonate while bentonite is substituted to an amount corresponding to 1–5%, preferably 2% or so, of calcium carbonate.

There is no particular restriction to the shape of a denitrifying composition of this invention, but it is advantageous for the composition to have a certain size and a surface area as large as possible in order to increase the contact area with raw water or effluent to be treated and to prevent the composition itself from flowing out. Therefore, a preferable shape is massive, granular, or molded. The molded form here means a form with a specific shape such as plate, bar, and honeycomb. In case of a mass, a particle diameter of 0.25–1 mm produces the anticipated effect faster than those with a particle diameter of 1–3 mm or 3–5 mm, but a smaller diameter has a larger possibility of blocking and flow-out loss. Hence, the optimal size varies with the mode of usage. The average particle diameter for a long-term industrial use is adequately 2–50 mm and is advantageously kept below 100 mm.

A denitrifying composition of this invention is produced as follows: where sulfur, calcium carbonate or a substance comprising mainly thereof, and a microporous substance are used, they are mixed, the sulfur is melted by heating at 112–180° C., preferably 112–125° C., the mixture is rapidly cooled, for example, by throwing it into water, and the resulting solid is crushed or granulated.

Instead of melting sulfur by heating, sulfur melted in advance may be used. That is, sulfur is melted first, calcium carbonate, a microporous substance, and other substances to be added as needed are added, mixed, and rapidly cooled. During this operation, it is preferable to add calcium carbonate, a microporous substance, and other substances in the form of powder or granule as mentioned earlier. Here, the specific surface area of calcium carbonate in use is 2,000–5,000 $cm^2/g$, preferably 2,500–4,000 $cm^2/g$, by air permeability determination. A larger particle size is more advantageous where calcium carbonate is used in a larger amount and calcium carbonate with a particle diameter of 5 mm or so can be used up to approximately three times the amount of sulfur.

Calcium carbonate with a smaller particle diameter is more effective for enhancing the activity of microorganisms, but a specific surface area in excess of 5,000 $cm^2/g$ by air permeability determination decreases the bulk specific gravity and it becomes difficult for calcium carbonate to coexist in an amount required for maintaining the pH at a neutral level. With a specific surface area of 2,500–4,000 $cm^2/g$, it is possible to obtain not only good granules or masses but also the coexistence of calcium carbonate and sulfur at a weight ratio of approximately 1:1. The ratio of calcium carbonate to sulfur is 30–300 parts by weight, preferably 100–150 parts by weight, more preferably 100–120 parts by weight, of calcium carbonate to 100 parts by weight of sulfur, and most preferably the two are used in approximately the same amount. A smaller amount of calcium carbonate causes a shortage of calcium carbonate necessary for the neutralization reaction while a larger amount causes a shortage of the ability to act as a binder of sulfur and makes it difficult to obtain a stable and strong solid.

For incorporation of a microporous substance, 10 parts by weight of sulfur, 10–15 parts by weight of calcium carbonate, and 1–3 parts by weight of a microporous substance are mixed, the sulfur is melted to form a homogeneous dispersion, and the dispersion is solidified by rapid cooling.

After solidification by rapid cooling, the solid is crushed to masses or granules or further processed to molded forms. Crushing renews the surface and exposes faces other than the sulfur layer with the resultant increase in performance as denitrifying material.

The solid obtained by this invention can be crushed or granulated in the usual manner and a special granulating step such as pressing is not required. Moreover, when the solid obtained by this -invention is so crushed as to conform to the target particle diameter, the whole surface formed by crushing acts effectively to let microorganisms manifest their activity and, while not in use, is oxidized with difficulty by oxygen in air and exhibits good storage stability.

A denitrifying material of this invention comprises a denitrifying composition of this invention and mineral fibers. Mineral fibers to be mixed with a denitrifying composition include rock wool, glass wool, ceramic wool, and carbon wool, either singly or as a mixture of two kinds or more, and inexpensive rook wool is preferable. Rock wool is readily processed to granular products, exhibits excellent water retention, has openings suitable for the growth of microorganisms, and performs a function of neutralizing even highly acidic effluent because of its basic chemistry.

Rock wool is obtained by melting a variety of metallurgical slags such as blast furnace slag and electric furnace slag, natural rocks such as basalt and diabase, or a mixture of the foregoing in an electric furnace or a cupola and converting the melt to fibers by application of centrifugal force and/or pressurized gas. Rock wool is mainly composed of CaO, $SiO_2$ and $Al_2O_3$ and additionally contains MgO, $Fe_2O_3$ and the like. Granular rock wool is obtained by processing rock wool by a granulator and it is useful when its particle diameter is 1–50 mm, preferably 5–20 mm. Also useful is a material obtained by molding a mixture of rock wool and a resin binder into a board followed by cutting or crushing or a material obtained by solidifying a mixture of granular rock wool and an inorganic hydraulic binder. Rock wool of this type can be mixed as it is with a denitrifying composition or, if necessary, after preparation of particles of uniform size by such operation as classification.

Mixing of a denitrifying composition and mineral fibers can be carried out by preparing the two in the desired shape and size by such means as crushing and then blending the two in a known mixer such as drum tumbler and ribbon blender. The mixing ratio of the two is 100 parts by weight of the denitrifying composition and 5 parts by weight or more, preferably 10–500 parts by weight, of the mineral fibers. A smaller amount of mineral fibers leads to a lower ability of the denitrifying composition to retain water and the portion of the denitrifying composition protruding from the surface of the water during a dearth of water becomes dry.

Mixing of mineral fibers in this manner allows a denitrifying material to maintain its ability to retain water even during a dearth of water. That is, water is sucked up from the mineral fibers in water to those above the surface of the water by capillary action and a denitrifying material containing a denitrifying composition and protruding above the surface of the water does not dry even during a dearth of water and sulfur-oxidizing bacteria do not perish. Effluent sucked up into the denitrifying material above the surface of the water is also denitrified.

Rock wool is rich in mineral ingredients such as Mn, Zn, Cu, Mo, Fe, and B and they elute and produce an effect to activate sulfur-oxidizing bacteria. Moreover, a large volume of openings present in mineral fibers is suitable for the growth of other microorganisms such as ammonia-assimilating bacteria and protozoa that decompose organic matters.

A denitrifying composition obtained in this manner and a denitrifying material containing the composition are suitable for purifying water relating to nitrates nitrogen while removing nitrates nitrogen of high concentration and preventing the pH of treated water from becoming strongly acidic.

The reason for this beneficial effect of a denitrifying composition of this invention is the coexistence of calcium carbonate and sulfur in the same particle. Furthermore, the additional coexistence of a microporous substance simultaneously provides micropores for a carrier or a dwelling of sulfur-oxidizing bacteria or for a place of colonization and growth of bacteria. Calcium carbonate and sulfur acting as nutrients make it unnecessary to supply from outside sulfur that is a source of nutrient and carbon that is necessary for the synthesis of bacteria and the active region of sulfuroxidizing bacteria is nearly neutral in pH where a high microbial activity is maintained. With a composition such as this, the pH is measured nearly neutral and ions are in good balance. Hence, the denitrifying ability improves markedly and contributes a great deal to improvement of water quality; for example, nitrates nitrogen present even at high concentration exceeding 150 ppm in stagnant water can surely be removed.

The aforementioned situation is explained with reference to FIG. 1 wherein calcium carbonate ($CaCO_3$) is dispersed in sulfur (S). A microporous substance is also present dispersed in sulfur (S). Sulfur-oxidizing bacteria dwell not only near the surface of the denitrifying composition but also inside the microporous substance and their principal active region is near the surface of the denitrifying composition This active region which is in contact with the water to be treated is nearly neutral.

In contrast, in accordance with the method for mixing individual particles of calcium carbonate and sulfur as shown in FIG. 2, the pH of the treated water is seemingly neutral and the resulting balance of ions is seemingly good, but the region near the surface of a sulfur (S) particle which is the active region of sulfur-oxidizing bacteria becomes acidic and the microbial activity diminishes. Also, the region near the surface of a calcium carbonate ($CaCO_3$) particle becomes alkaline.

A denitrifying composition of this invention can stably perform denitrification at all flow velocities excepting the limiting flow velocity. Moreover, calcium carbonate in coexistence is in an amount sufficiently reactive to neutralize the produced sulfuric acid and the system does not turn alkaline nor acidic and affects the water area insignificantly. Furthermore, negatively charged microorganisms can be retained as a result of adsorption of ammoniacal nitrogen by addition of a substance possessing an ion exchange capacity and adsorption of calcium ions effected separately. It is also possible to let phosphoric acid adhere to a part of calcium carbonate and let plants utilize such adhering phosphoric acid. For example, with the use of a denitrifying composition of this invention, it is possible to promote purification of water by applying a yellow iris with a denitrifying composition of this invention used as culture medium.

A denitrifying composition and a denitrifying material of this invention can be used for treating effluent containing nitrates nitrogen, for example, treating factory effluent, city sewage, and agricultural effluent such as effluent of underdrains in farms. The composition or the material may be used in a variety of manners, for example, it is placed in a cage or a net and immersed in effluent, a column is packed with it and effluent is passed through the packed column, or it is dispersed in a tank and brought into contact with effluent; however, it is advantageous to immerse it in the channels for effluent of underdrains and use it over a long period of time. Continuous use for several years is feasible if the target is effluent of relatively low concentration of nitrates nitrogen such as agricultural effluent.

PREFERRED EMBODIMENTS OF THE INVENTION

EXAMPLE 1

Figure 1:
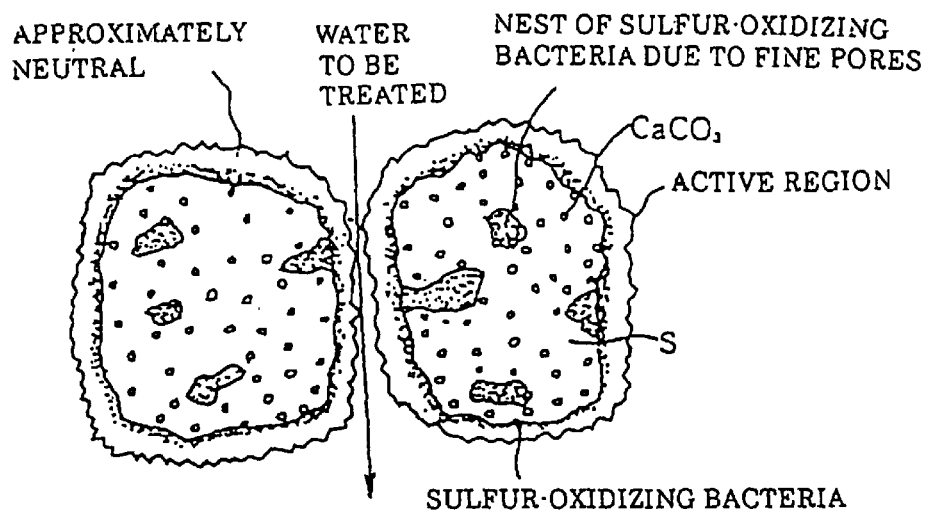
FIG. 1 is a schematic illustration of the surface and inner structure of a denitrifying composition of this invention.
Figure 2:
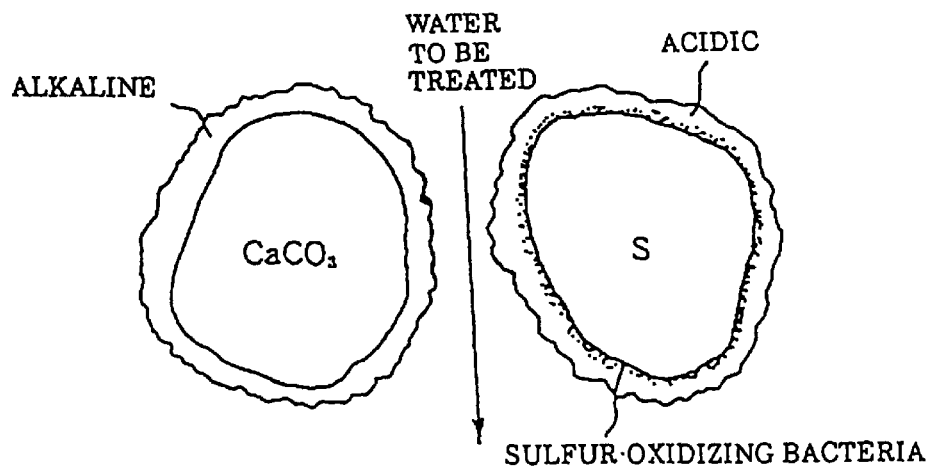
FIG. 2 is a schematic illustration of the surface and inner structure of a denitrifying composition prepared by merely mixing the particles of calcium carbonate and sulfur.

In a vat were placed 10 parts by weight of calcium carbonate powder (specific surface area, 3,100 cm$^2$/g) and 10 parts by weight of sulfur, the contents were heated at approximately 120° C. to melt the sulfur, and mixed homogeneously by stirring. The mixture was then thrown into a large volume of water at normal temperature for rapid cooling, solidified, and crushed to prepare a denitrifying composition (invention 4) with a particle diameter of 5–10 mm.

EXAMPLE 2 AND COMPARATIVE EXAMPLE 1

A denitrifying composition (invention 1) was prepared as in Example 1 by using 10 parts by weight of calcium carbonate powder.(specific surface area, 3,100 cm$^2$/g), 10 parts by weight of sulfur, and 3 parts by weight of carbon derived from rice hull.

Likewise, a denitrifying composition (invention 2) was prepared as in Example 1 by using 10 parts by weight of calcium carbonate powder (specific surface area, 3,100 cm$^2$/g), 10 parts by weight of sulfur, 1 part by weight of carbon derived from rice hull, and I part by weight of kieselguhr.

Additionally, a denitrifying composition (invention 3) was prepared as in Example 1 by using 10 parts by weight of calcium carbonate powder (specific surface area, 3,100 cm$^2$/g) 10 parts by weight of sulfur, and 2 parts by weight of kieselguhr.

As a comparative example, a material (comparison 1) was prepared by merely mixing 10 parts by weight of granular sulfur with a particle diameter of 5–10 mm and 10 parts by weight of calcium carbonate particles.

EXAMPLE 3

Each of inventions 1 to 4 and comparison 1 prepared in Examples 1 and 2 and Comparative Example 1 was taken as specimen, placed in a flask together with test water, and batch-tested for denitrification at an average water temperature of 20° C. The test water was prepared by adding 1 wt % of river sediment (containing sulfur-oxidizing bacteria) sampled from underdrains in Fukaya City, Saitama Prefecture, to raw water which was an aqueous solution (aqueous $KNO_3$) with a nitrate nitrogen concentration of, 150 mg/1. For comparison, a test was conducted similarly free of any of the specimens by using test water containing only the river sediment.

Table 1 shows a decrease in the concentration (mg/l) of nitrates nitrogen in the batch test. Any of the inventions was confirmed to remove nitrates nitrogen of high concentration satisfactorily.

TABLE 1

| Specimen | Starting day | After 5 days | After 10 days | After 15 days | After 20 days | After 30 days |
| --- | --- | --- | --- | --- | --- | --- |
| Invention 1 | 175 | 111 | 68 | 45 | 14 | 8 |
| Invention 2 | 175 | 111 | 75 | 52 | 18 | 10 |
| Invention 3 | 175 | 111 | 79 | 52 | 19 | 8 |
| Invention 4 | 175 | 122 | 93 | 77 | 29 | 20 |
| Comparison 1 | 175 | 122 | 122 | 131 | 80 | 82 |
| None | 175 | 173 | 172 | 172 | 172 | 172 |

The pH of the system changed as shown in Table 2 and the pH of the treated water was confirmed not to turn strongly acidic.

TABLE 2

| Specimen | After 5 days | After 10 days | After 15 days | After 20 days | After 30 days |
| --- | --- | --- | --- | --- | --- |
| Invention 1 | 6.7 | 6.7 | 6.6 | 6.6 | 6.5 |
| Invention 2 | 6.6 | 6.5 | 6.6 | 6.5 | 6.5 |
| Invention 3 | 6.8 | 6.8 | 6.9 | 6.6 | 6.5 |
| Invention 4 | 6.8 | 6.7 | 6.7 | 6.6 | 6.6 |
| Comparison 1 | 6.8 | 6.7 | 6.7 | 6.6 | 6.5 |
| None | 6.7 | 6.0 | 4.5 | 4.9 | 4.3 |

The concentrations in mg/l of sulfate ions and calcium ions were determined 20 days after the start of denitrification and the results are shown in Table 3.

TABLE 3

|  | $SO_4^{2-}$ | $Ca^{2+}$ |
| --- | --- | --- |
| Invention 1 | 503 | 523 |
| Invention 4 | 495 | 520 |
| Comparison 1 | 480 | 540 |

EXAMPLE 4

Sulfur powder was melted at 120° C., mixed homogenously with lime powder at a ratio by weight of 1:1, and the mixture was cooled rapidly and crushed to a particle diameter of 5–20 mm to prepare a denitrifying composition (invention 5). A test plant was filled with 80 kg (0.94 m$^3$) of the composition, and effluent of the following properties from underdrains in a farm was treated by passage through the test plant: pH, 6.8–8.0; SS, 0–3 mg/l; $NH_4$—N, 0.01 mg/l or less; $NO_3$—N, 60–93 mg/l ; $SO_4^{2-}$—S, 22–37 mg/l ; $Ca^{2+}$, 90–132 mg/l . Before the start of the experiment, 100 g of the actual soil cultivated on the Taylor culture C, medium as microorganism source was domesticated for 8 days in a container filled with effluent from underdrains.

When the experiment was carried out by controlling the loading rate (amount of raw water per day/amount filled of denitrifying composition) at 0.5–10, removal of 99% or more of the concentration of nitrates nitrogen in raw water was obtained at an increasingly higher loading rate up to approximately twice per day and the treated water showed the following properties: pH, 6.8–7.3; SS, 0 mg/l ; $NH_4$—N, 0.4–1.4 mg/l ; $SO_4^{2-}$—S, 184–214 mg/l ; $Ca^{2+}$, 170–230 mg/l . The maximum denitrifying rate then was 207 g as nitrogen per day per 1 ton. There was no channeling and dislocation of bubbles and a stable operation was possible during the test period extending over approximately 6 months.

EXAMPLE 5

Sulfur powder was melted at 150° C., mixed homogeneously with heavy calcium carbonate (T-200, product of K.K. Nitchitsu, Blaine specific surface area 2,800 $cm^2$) at a ratio by weight of 1:1, rapidly cooled by cold water, and crushed to a particle diameter of 5–20 mm to prepare a denitrifying composition.

In a ribbon blender were placed 100 parts by weight of the denitrifying composition and 20 parts by weight of granular rock wool (S-fiber, product of Shinnikka Rock Wool K.K., average particle diameter 30 mm) to prepare a denitrifying material.

The material was used in batch test for denitrifying raw water prepared by adding 50 ml of a commercial culture of sulfur-oxidizing bacteria (DSM807) to 1,000 ml of artificial effluent that was prepared by adding nitrates nitrogen to pure water at a rate of 150 mg/l.

The denitrifying test was carried out by introducing 150 ml of the aforementioned raw water to a glass vessel containing 300 g of the denitrifying material and keeping the contents at an average water temperature of 20° C. for 7 days. The degree of removal of nitrates nitrogen after 7 days was 100%. Thereafter, the amount of the aforementioned raw water was increased to 1,000 ml in order to immerse the portion of the denitrifying material protruding above the surface of the raw water and the test was continued for another 7 days. The removal of nitrogen after a total of 14 days was 100%.

EXAMPLE 6

A denitrifying material was prepared as in Example 5 except adding 10 parts by weight of carbon derived from rice hull and the denitrification test was carried out as in Example 5. The removal of nitrogen was 100% after 7 days and it was also 100% after 7 days from the time of increasing the amount of the raw water or after a total of 14 days.

As is apparent from the aforementioned examples, where a denitrifying material was prepared by mixing a denitrifying composition with granular rock wool, the denitrifying acitivity of sulfur-oxidizing bacteria does not diminish even when the material in part protrudes above the surface of the raw water and the degree of denitrification as a whole can be prevented from dropping.

INDUSTRIAL APPLICABILITY

A denitrifying composition of this invention for microbially removing nitrates nitrogen performs excellently with a high degree of removal of nitrates nitrogen because of the coexistence therein of calcium carbonate and sulfur; the composition excludes the need to supply essential nutrients for the microorganisms, maintains a good balance in the system before and after the reaction and can be used directly as substrate for cultivation of the microorganisms. Moreover, since calcium carbonate coexists in an amount sufficiently reactive to neutralize sulfuric acid being formed, the composition turns neither alkaline nor acidic, influences the water area insignificantly, and can be applied to treating effluent containing a variety of nitrates nitrogen. A denitrifying composition of this invention which contains a substance mainly consisting of calcium carbonate and sulfur as main components and a microporous substance as a co-existing component performs excellently in removing nitrates nitrogen present in high concentration in effluent of underdrains in heavily manuring farms, the growth of bacteria occurs smoothly as sulfur that is nutrient for sulfur-oxidizing bacteria is oxidized as needed by the bacteria and carbon that is necessary for the synthesis of bacteria coexist and, at the same time, the removal of nitrogen proceeds efficiently as micropores provide places for colonization of bacteria. Moreover, the pH is well balanced and maintained at 6.5–7.5 in the system. With the use of a denitrifying composition of this invention, water is retained during a dearth of water, the substrate for removing nitrates nitrogen protruding above the surface of the water does not dry, and sulfur-oxidizing bacteria do not perish. Furthermore, the mineral components in mineral fibers are effective for activating sulfur-oxidizing bacteria.

A process of this invention for producing the aforementioned denitrifying composition can be practiced efficiently in a short time at low cost.

What is claimed is:

1. A denitrifying material comprising a mixture of a denitrifying composition for microbially removing nitrate nitrogen from water, said composition comprising particles of calcium carbonate dispersed in sulfur by heating and dispersing calcium carbonate particles in melted sulfur and solidifying the dispersion by cooling, wherein a microporous substance is additionally dispersed in the sulfur and wherein the ration by weight of sulfur to calcium carbonate is 1:0.3 to 1:3, and mineral fibers.

2. The denitrifying material of claim 1, wherein the denitrifying composition comprises 10 parts by weight of sulfur, 10–15 parts by weight of calcium carbonate, and 1–3 parts by weight of a microporous substance.

3. The denitrifying material of claim 1, wherein the sulfur in the denitrifying composition is amorphous sulfur.

4. The denitrifying material of claim 1, wherein the shape of the denitrifying composition is granular, massive, or molded.

5. The denitrifying material of claim 1, wherein the microporous substance in the denitrifying composition is carbon derived from rice hull.

6. The denitrifying material of claim 1, wherein the microporous substance in the denitrifying composition is kieselguhr.

7. The denitrifying material of claim 1, wherein the microporous substance in the denitrifying composition is a cation exchanger.

8. The denitrifying material of claim 7, wherein said cation exchanger is selected from the group consisting of natural zeolites, synthetic zeolites, and bentonite.

9. The denitrifying material of claim 1, wherein said mineral fibers are rock wool.

10. A method of decreasing the nitrate nitrogen concentration of water which comprises the step of contacting water containing nitrate ions with the denitrifying material of claim 1.

11. A method of decreasing nitrate nitrogen concentration of an effluent selected from the group consisting of factory effluent, sewage effluent, and agricultural effluent, which method comprises the steps of placing the denitrifying material of claim 1 in a cage or a net to provide a denitrifying assembly and immersing the denitrifying assembly in said effluent.

12. A method of decreasing nitrate nitrogen concentration of an effluent selected from the group consisting of factory effluent, sewage effluent, and agricultural effluent, which method comprises the steps of packing a column with the denitrifying material of claim 1 to provide a denitrifying assembly and passing said effluent through said denitrifying assembly.

13. A method of decreasing nitrate nitrogen concertration of an effluent selected from the group consisting of factory effluent, sewage effluent, and agricultural effluent, which method comprises the steps of dispersing the denitrifying material of claim 1 in a tank and bringing said effluent into contact with said composition in said tank.

* * * * *